(12) United States Patent
Anamura et al.

(10) Patent No.: US 6,882,257 B2
(45) Date of Patent: Apr. 19, 2005

(54) EARTH LEAKAGE BREAKER (75) Inventors: Takashi Anamura, Tokyo (JP); Setsuo Hosogai, Tokyo (JP); Kunihiko Takahata, Osaka (JP)

(73) Assignees: Mitsubishi Denki Kabushiki Kaisha, Tokyo (JP); Toshin Denki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/312,257
(22) PCT Filed: Aug. 21, 2001
(86) PCT No.: PCT/JP01/07159
§ 371 (c)(1), (2), (4) Date: Dec. 24, 2002
(87) PCT Pub. No.: WO02/17458
PCT Pub. Date: Feb. 28, 2002

(65) Prior Publication Data
US 2003/0099073 A1 May 29, 2003

(30) Foreign Application Priority Data
Aug. 22, 2000 (JP) .................................. P2000-251039

(51) Int. Cl.$^7$ ............................................... H01H 75/00
(52) U.S. Cl. ............................................ 335/18; 361/42
(58) Field of Search ........................ 335/18, 42–51; 361/42

(56) References Cited

U.S. PATENT DOCUMENTS

| 4,541,030 A | 9/1985 | Biegelmeier | |
| 4,893,479 A | * 1/1990 | Gillett et al. | 62/213 |
| 5,172,293 A | * 12/1992 | Matsumoto et al. | 361/102 |
| 5,276,416 A | * 1/1994 | Ozaki | 335/18 |
| 5,654,857 A | * 8/1997 | Gershen | 361/42 |
| 5,757,254 A | * 5/1998 | Kurono et al. | 335/35 |
| 6,014,297 A | * 1/2000 | Clarey et al. | 361/42 |
| 6,532,139 B1 | * 3/2003 | Kim et al. | 361/42 |

FOREIGN PATENT DOCUMENTS

| JP | 55-10815 | 1/1980 | |
| JP | 4-25437 | 2/1992 | |
| JP | 5-252646 | 9/1993 | |
| JP | 7-147724 | 6/1995 | |
| JP | 08111161 A | * 4/1996 | H01H/83/10 |
| JP | 10-106424 | 4/1998 | |
| JP | 10136555 A | * 5/1998 | H02H/3/16 |
| JP | 10-326702 | 12/1998 | |
| WO | WO 02/17458 A1 | 8/2001 | |

* cited by examiner

Primary Examiner—Lincoln Donovan
Assistant Examiner—Bernard Rojas
(74) Attorney, Agent, or Firm—Sughrue Mion, PLLC (57) ABSTRACT Malfunction of an earth leakage breaker due to a lightning surge is prevented, and when a lightning arrester is short-circuited and damaged by a high-level lightning surge, a power supply short circuit is prevented.

A contact 41, an overcurrent detector section 43, and a zero phase current transformer 44 are disposed in order from a power supply side to a load side, and a lightning arrester 3 is connected between the overcurrent detector section 43 and the zero phase current transformer 44.

4 Claims, 10 Drawing Sheets

EARTH LEAKAGE BREAKER

TECHNICAL FIELD

The present invention relates to an earth leakage breaker capable of preventing a malfunction caused by a lightning surge and protecting from a short circuit when a lightning arrester is damaged by a lightning surge.

BACKGROUND ART

Figure 15:
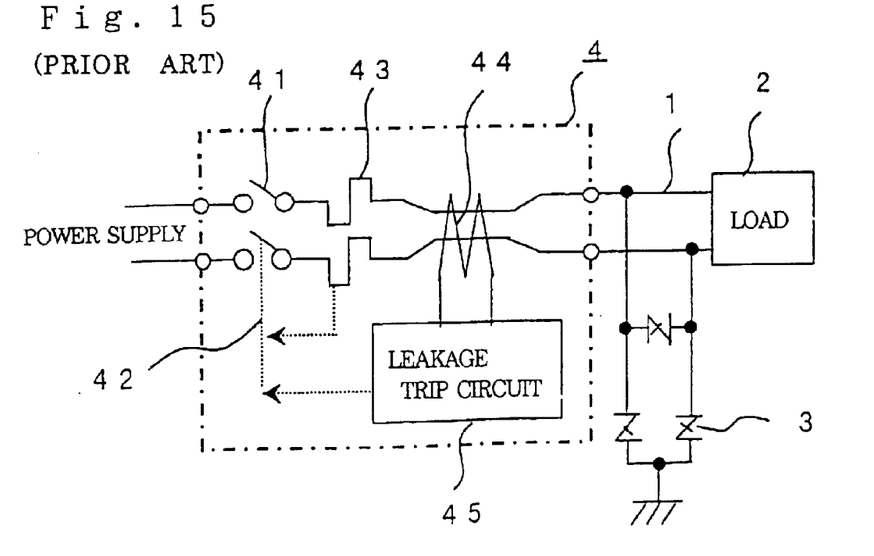
FIG. 15 is a diagram showing a connection arrangement between an earth leakage breaker and a lightning arrester according to a prior art.
Figure 16:
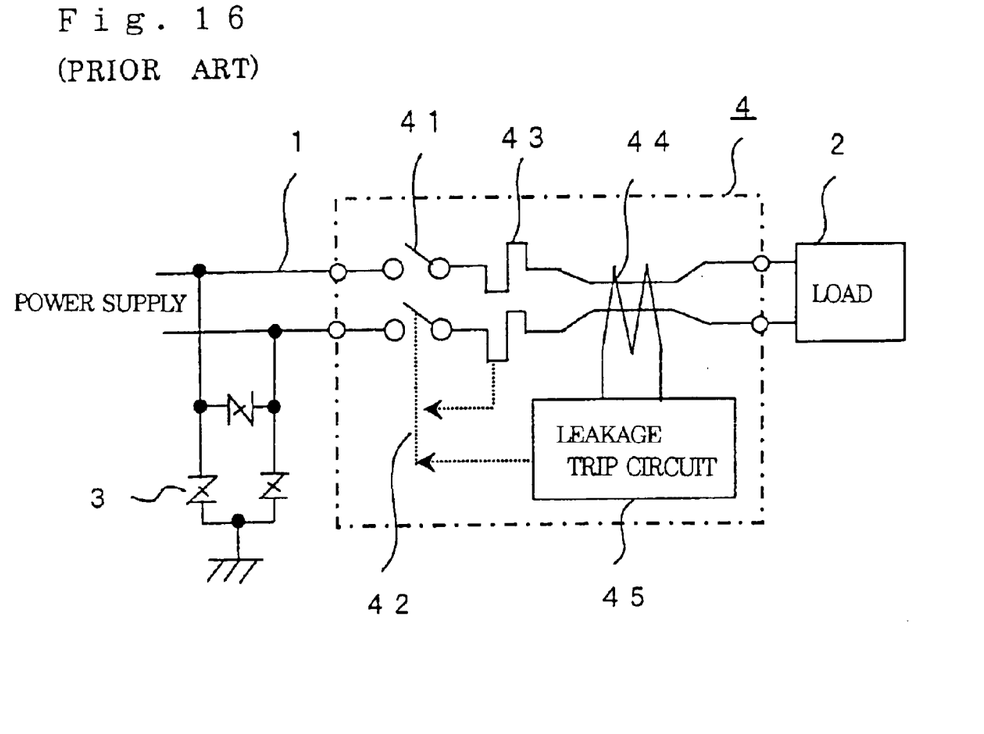
FIG. 16 is a diagram showing a connection arrangement between an earth leakage breaker and a lightning arrester according to another prior art.

Hitherto, circuits shown in FIG. 15 and FIG. 16 are known as examples of a circuit in which an earth leakage breaker and a lightning arrester are connected to each other in order to protect electrical machinery and apparatus from a lightning surge.

In the drawings, reference numeral 1 is an electric path, numeral 2 is an electrical machinery acting as a load, numeral 3 is a lightning arrester, and numeral 4 is an earth leakage breaker. The earth leakage breaker 4 is comprised of a contact 41 for switching on/off the electric path 1, a switch mechanism 42 composed of a toggle link mechanism for opening and closing the foregoing contact 41, an overcurrent detector section 43 composed of an electromagnetic device including a bimetal for detecting an overcurrent of the electric path 1, oil dashpot or the like, a zero phase current transformer 44 for detecting a current leakage of the electric path 1, and a leakage trip circuit 45 for determining an output level of the zero phase current transformer 44. When detecting an overcurrent of the load 2 or current leakage of at least a predetermined level of a load circuit is detected, the earth leakage breaker 4 releases the switch mechanism 42 from a closed state, and the switch mechanism 42 opens the contact 41 in order to interrupt an electric current to the load 2.

In the connection arrangement shown in FIG. 15, the lightning arrester 3 is connected between the earth leakage breaker 4 and the load 2. A lightning surge that invades from the power supply is guided through the overcurrent detector section 43 and the zero phase current transformer 44, and is absorbed by the lightning arrester 3. If the invading lightning surge is of a large energy, the lightning arrester 3 is short-circuited by the energy, and the overcurrent detector section 43 detects a short circuit current of the electric path 1 due to the short circuit and opens the contact 41 in order to prevent a short circuit accident.

It is a recent trend to employ the earth leakage breaker 4 in which the leakage trip circuit 45 is resistant to a lightning surge and capable of preventing a malfunction by discriminating a detected waveform. However, in such an earth leakage breaker, even in case of a lightning surge not so large as to short-circuit and break the lightning arrester 3, an electric current flows to an earth through the lightning arrester 3 and is detected by the leakage trip circuit 45, thereby erroneously occurring an earth leakage breaking operation.

The leakage trip circuit 45 resistant to a lightning surge and capable of preventing a malfunction determines a waveform peculiar to the lightning surge. In some cases, however, during the propagation of waveform through a distribution line, a waveform change may take place from the waveform peculiar to the lightning surge due to line constant of the distribution line and others, whereby an earth leakage breaking occurs erroneously. Such a malfunction of the earth leakage breaker 4 causes a power failure of the load 2, which results in trouble and bothers on the part of electricity users.

In the connection arrangement shown in FIG. 16, the lightning arrester 3 is connected between the power supply and the earth leakage breaker 4. In the connection of this type, a lightning surge of a level at which the lightning arrester 3 works is absorbed by the lightning arrester 3 itself and is not inputted to the earth leakage breaker 4. On the other hand, if the invading lightning surge is of a large energy, a power supply short circuit accident may occur due to damage of the lightning arrester 3, and therefore the connection arrangement in FIG. 16 is not recommendable.

As described above, in the conventional connection of the lightning arrester to the earth leakage breaker, a problem exists in that it is impossible to prevent both malfunction caused by a lightning surge and occurrence of a power supply short circuit accident.

The present invention was made to solve such a problem and provides an earth leakage breaker capable of preventing a malfunction of the earth leakage breaker caused by a lightning surge and preventing a short circuit accident when the lightning arrester is short-circuited and broken by a lightning surge of high level.

DISCLOSURE OF INVENTION

An earth leakage breaker according to the present invention includes: a contact for turning on/off an electric path by opening and closing operation of a switch mechanism; an overcurrent detector section that opens the contact through the switch mechanism upon detecting an overcurrent; a zero phase current transformer for detecting a leak; and leakage trip means that opens the contact through the switch mechanism when the mentioned zero phase current transformer detects a current leakage exceeding a predetermined level; and in which the contact, the overcurrent detector section, and the zero phase current transformer are disposed in order from a power supply side toward a load side, and a lightning arrester is connected between the overcurrent detector section and the zero phase current transformer.

The lightning arrester is preferably accommodated in a housing of the earth leakage breaker, and the mentioned housing is provided with earth means from the lightning arrester.

The lightning arrester is preferably accommodated in another housing provided with earth means, and the mentioned another housing is attached to the earth leakage breaker.

Another earth leakage breaker includes: a contact that turns on/off an electric path by opening and closing operation of a switch mechanism; an overcurrent detector section that opens the contact through the switch mechanism upon detecting an overcurrent; a zero phase current transformer for detecting a leak; and leakage trip means that opens the contact through the switch mechanism when the mentioned zero phase current transformer detects a current leakage exceeding a predetermined level; and in which the earth leakage breaker is provided with connecting means for connection to the lightning arrester through between the overcurrent detector section and the zero phase current transformer.

The connecting means for connection to the lightning arrester is preferably a lead wire led out from an opening provided on the housing of the earth leakage breaker.

The connecting means for connection to the lightning arrester is preferably a terminal disposed on the housing of the earth leakage breaker.

A lead wire connected to a terminal on the load side is preferably connected to the lightning arrester at a portion where the lead wire is rewound in the same winding number as a primary winding of the zero phase current transformer.

BRIEF DESCRIPTION OF DRAWINGS

FIGS. 2(a), (b) and (c) are exterior views each showing the earth leakage breaker according to Embodiment 1, and in which (a) is a front view, (b) is a side view and (c) is a rear view.

FIGS. 4(a) and (b) are exterior views each showing the earth leakage breaker according to Embodiment 2, and in which (a) is a front view and (b) is a side view.

FIGS. 6(a) and (b) are exterior views each showing the earth leakage breaker of Example 1 according to Embodiment 3, and in which (a) is a front view and (b) is a side view.

FIGS. 7(a), (b) and (c) are exterior views each showing the earth leakage breaker of Example 2 according to Embodiment 3, and in which (a) is a front view, (b) is a side view and (c) is a rear view.

FIGS. 9(a), (b) and (c) are exterior views each showing the earth leakage breaker according to Embodiment 4, and in which (a) is a front view, (b) is a side view and (c) is a rear view.

FIGS. 11(a) and (b) are exterior views each showing the earth leakage breaker of Example 1 according to Embodiment 5, and in which (a) is a front view and (b) is a side view.

FIGS. 12(a) and (b) are exterior views each showing the earth leakage breaker of Example 2 according to Embodiment 5, and in which (a) is a front view and (b) is a side view.

FIGS. 13(a), (b) and (c) are exterior views each showing the earth leakage breaker of Example 3 according to Embodiment 5, and in which (a) is a front view, (b) is a side view and (c) is a rear view.

BEST MODE FOR CARRYING OUT THE INVENTION

Embodiment 1.

The invention is hereinafter described in more detail with reference to the accompanying drawings.

Figure 1:
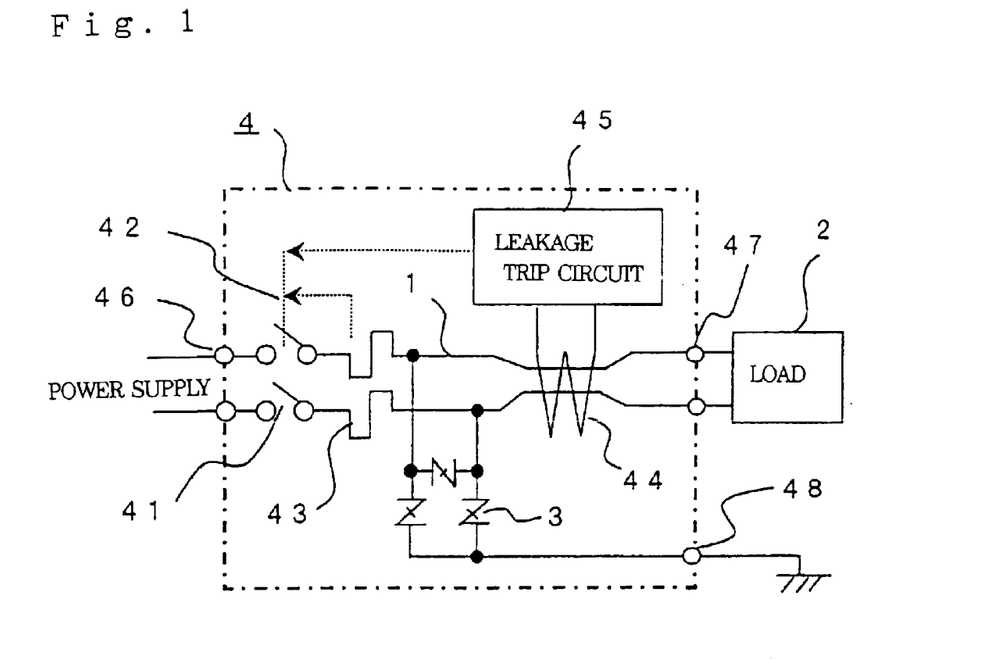
FIG. 1 is a diagram showing a connection arrangement between an earth leakage breaker and a lightning arrester according to Embodiment 1 of the present invention.
Figure 2:
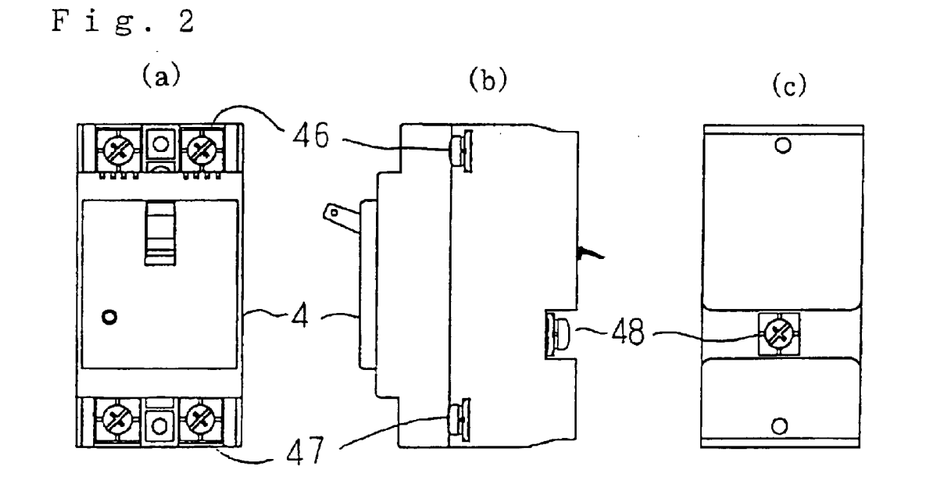

FIG. 1 is a diagram showing a connection arrangement between an earth leakage breaker and a lightning arrester according to Embodiment 1 of the invention, and FIGS. 2(a), (b) and (c) are exterior views each showing the earth leakage breaker of Embodiment 1. In the drawings, reference numerals 1 to 4 and 41 to 45 are the same as those in the description of the above-mentioned conventional devices. Numeral 46 is a power supply side terminal of the earth leakage breaker 4, numeral 47 is a load side terminal, and numeral 48 is an earth terminal disposed in an outer shell casing of a housing of the earth leakage breaker 4. In the earth leakage breaker of this Embodiment 1, the lightning arrester 3 is disposed in the housing of the earth leakage breaker 4. The electric path 1 is formed so that the contact 41, the overcurrent detector section 43, and the zero phase current transformer 44 are connected in the order from the power supply side terminal 46 toward the load side terminal 47, and the lightning arrester 3 is connected between the overcurrent detector section 43 and the zero phase current transformer 44. An earth end extending from the lightning arrester 3 is led to outside via the earth terminal 48 and is earthed.

In this manner, by connecting the lightning arrester 3 between the overcurrent detector section 43 and the zero phase current transformer 44, any lightning surge does not pass through the zero phase current transformer 44 but is absorbed by the lightning arrester 3, and this prevents a leakage malfunction due to the lightning surge. If the lightning arrester 3 is short-circuited by a high-level lightning surge, the overcurrent detector section 43 detects a short circuit current, and the contact 41 is opened and interrupted through overcurrent tripping, thereby preventing a short circuit accident.

Embodiment 2.

In the foregoing Embodiment 1, the lightning arrester 3 is disposed in the casing of the earth leakage breaker 4. However, in practical use, the lightning arrester 3 of different performance and different type is required depending upon the place where the earth leakage breaker 4 is installed and the kind of the electrical machinery to be protected. This Embodiment 2 is aimed to improve this point.

Figure 3:
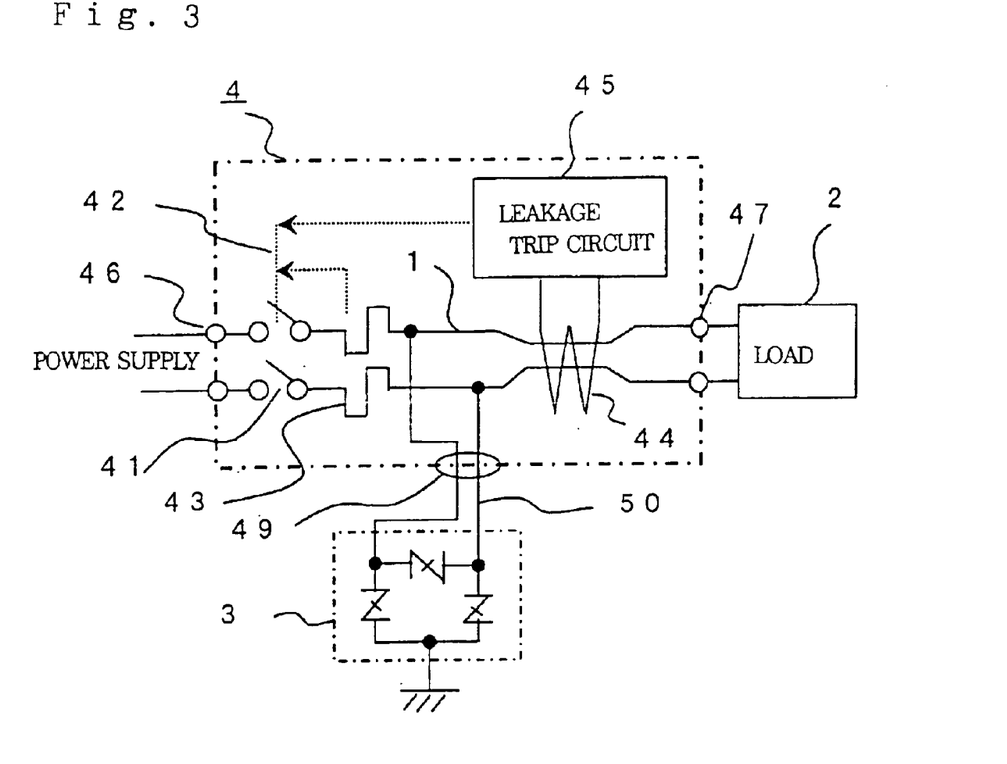
FIG. 3 is a diagram showing a connection arrangement between an earth leakage breaker and a lightning arrester according to Embodiment 2 of the invention.
Figure 4:
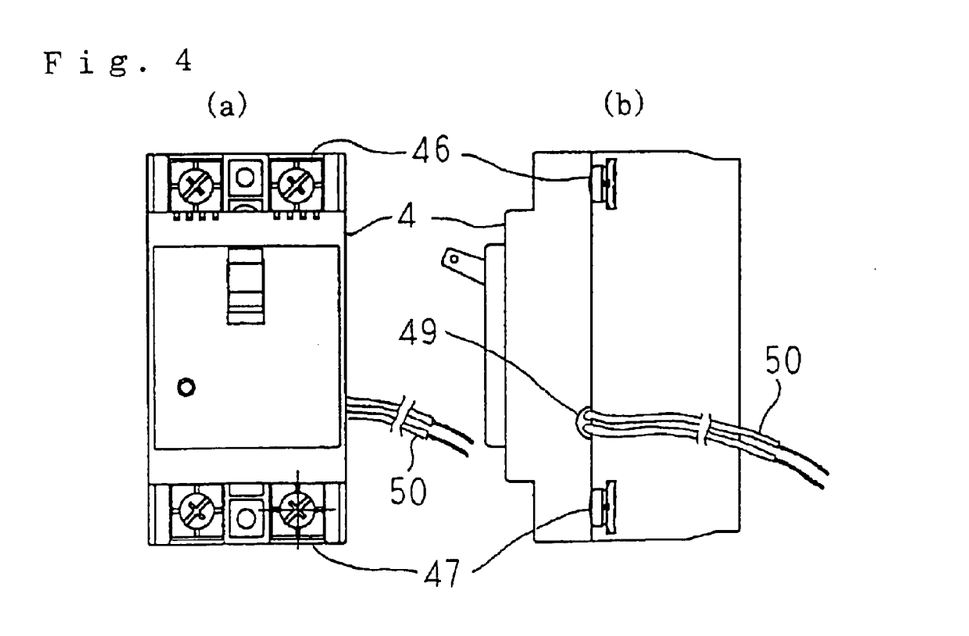

FIG. 3 is a diagram showing a connection arrangement between an earth leakage breaker and a lightning arrester according to Embodiment 2 of the invention and FIGS. 4(a) and (b) are exterior views each showing the earth leakage breaker according to Embodiment 2.

In the drawings, numerals 1 to 4 and 41 to 47 are the same as those described in the foregoing Embodiment 1.

Numeral 49 is an opening provided on the housing outer shell casing of the earth leakage breaker 4, numeral 50 is a lead wire for connection to the lightning arrester 3, and in which one end is connected between the overcurrent detector section 43 and the zero phase current transformer 44 of the electric path 1 and another end is inserted through the opening 49 and led to outside. The other end of the lead wire 50 is connected to the lightning arrester 3 selected according to the electrical machinery to be protected. As the result of extending the lead wire 50, it is possible to freely choose the place to install the lightning arrester 3.

Embodiment 3.

Figure 5:
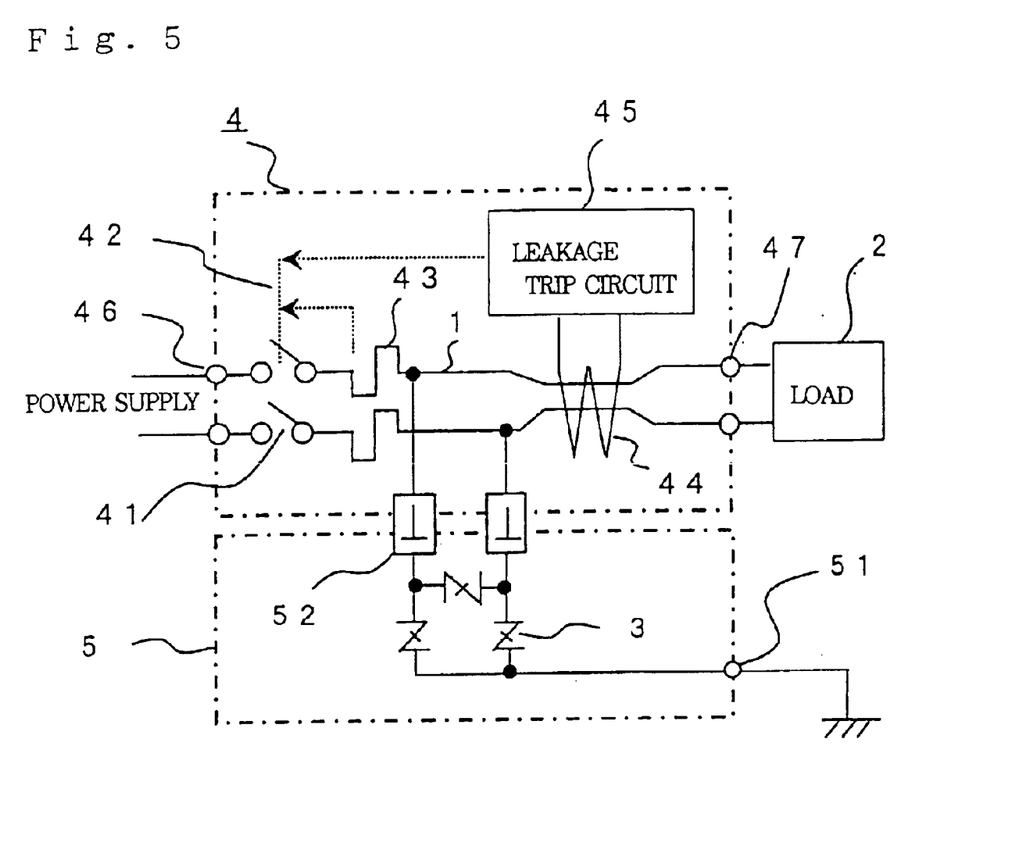
FIG. 5 is a diagram showing a connection arrangement between an earth leakage breaker and a lightning arrester according to Embodiment 3 of the invention.
Figure 6:
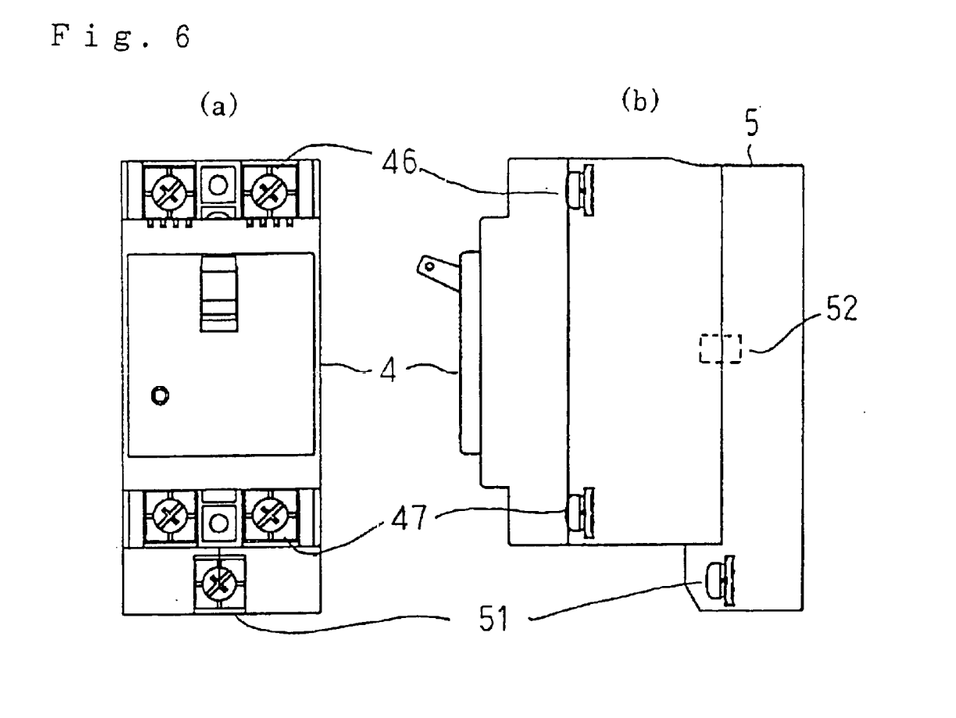
Figure 7:
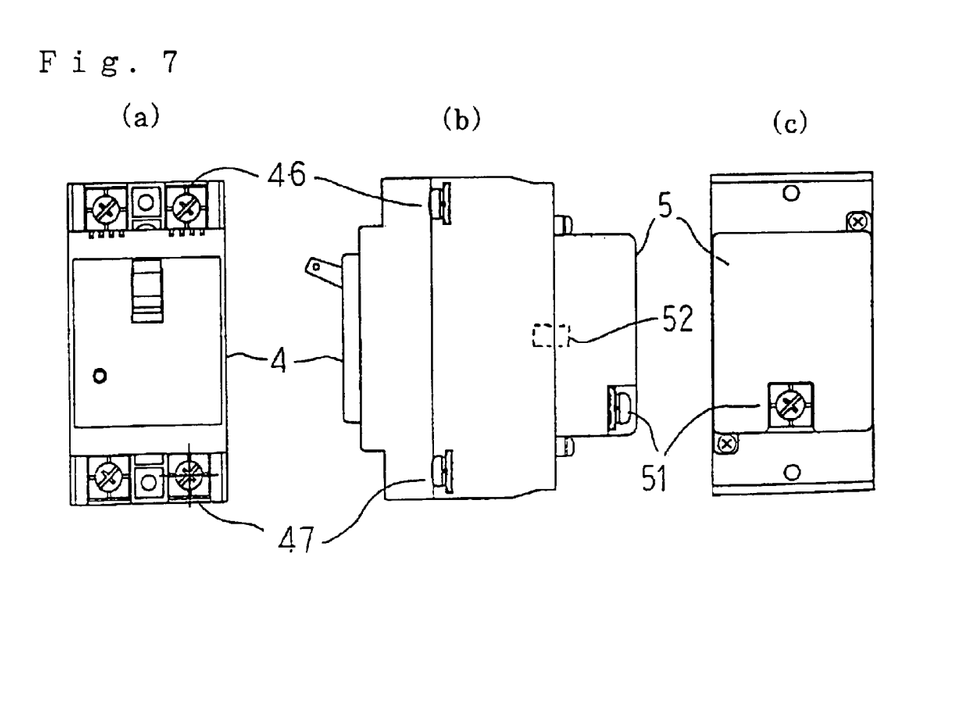

FIG. 5 is a diagram showing a connection arrangement between an earth leakage breaker and a lightning arrester according to Embodiment 3 of the invention, FIGS. 6(a) and (b) are exterior views each showing the earth leakage breaker of Example 1 according to Embodiment 3, and FIGS. 7(a), (b) and (c) are exterior views each showing the earth leakage breaker of Example 2 according to Embodiment 3.

In the drawings, numerals 1 to 4 and 41 to 47 are the same as those described in the foregoing Embodiment 1. Numeral 5 is a lightning arrester box in the form of a housing different from the earth leakage breaker 4, and the lightning arrester 3 is accommodated in the lightning arrester box 5. Numeral 51 is an earth terminal, and numeral 52 is a connector. The connector 52 is composed of a portion connected between the overcurrent detector section 43 and the zero phase current transformer 44 in the earth leakage breaker 4 and a portion connected to the lightning arrester 3 in the lightning arrester box 5. Combining the connector 52 electrically connects the earth leakage breaker 4 and the lightning arrester 3. The earth end extending from the lightning arrester 3 is led to outside via the earth terminal 51 and is earthed.

It is preferable to standardize the connector 52 and strengthen its association rigidity so that any of lightning arrester boxes 5, each accommodating therein a lightning arrester 3 of a different type, can be connected and associated at the same time by the connector 52. The earth leakage breaker of Example 1 shown in FIG. 6 has the earth terminal 51 at the front, and this facilitates earth wiring.

Embodiment 4.

Figure 8:
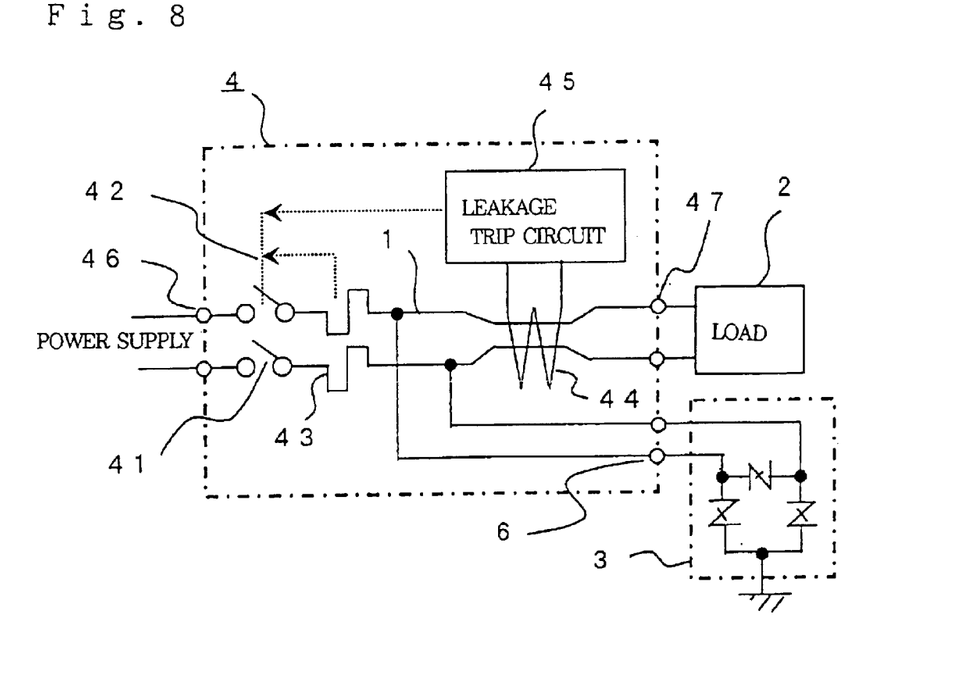
FIG. 8 is a diagram showing a connection arrangement between an earth leakage breaker and a lightning arrester according to Embodiment 4 of the invention.
Figure 9:
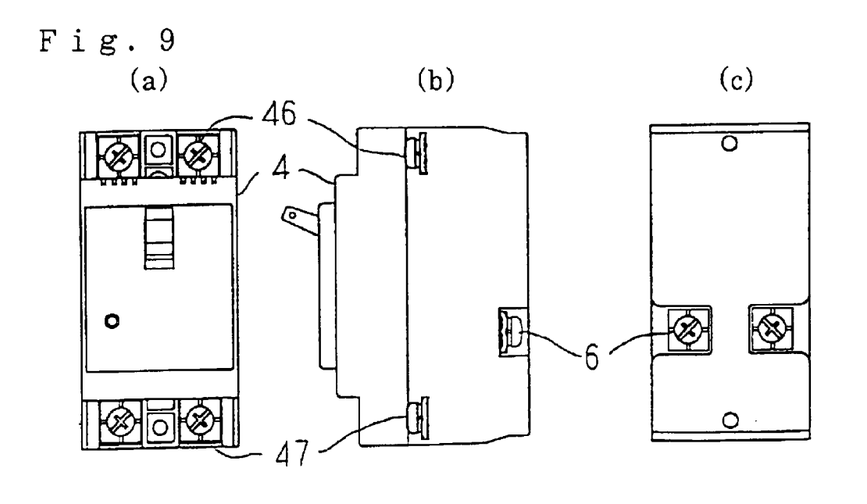

FIG. 8 is a diagram showing a connection arrangement between an earth leakage breaker and a lightning arrester according to Embodiment 4 of the invention, and FIGS. 9(a), (b) and (c) are exterior views each showing the earth leakage breaker according to Embodiment 4.

In the drawings, numerals 1 to 4 and 41 to 47 are the same as those described in the foregoing Embodiment 1. Numeral 6 is a connection terminal that is disposed on the housing outer shell casing of the earth leakage breaker 4 and acts as means for connecting to the lightning arrester 3. The connecting terminal 6 is electrically connected between the overcurrent detector section 43 and the zero phase current transformer 44 disposed in the earth leakage breaker 4.

The lightning arrester 3 resistant to high-level surge voltage may sometimes become too large in external dimensions to be accommodated in the mentioned earth leakage breaker 4 or the lightning arrester box 5. In such a case, it is possible to connect the lightning arrester 3 of any performance to the connecting terminal 6 from outside. Moreover, the damaged lightning arrester 3 can be exchanged without difficulty.

Embodiment 5.

Figure 10:
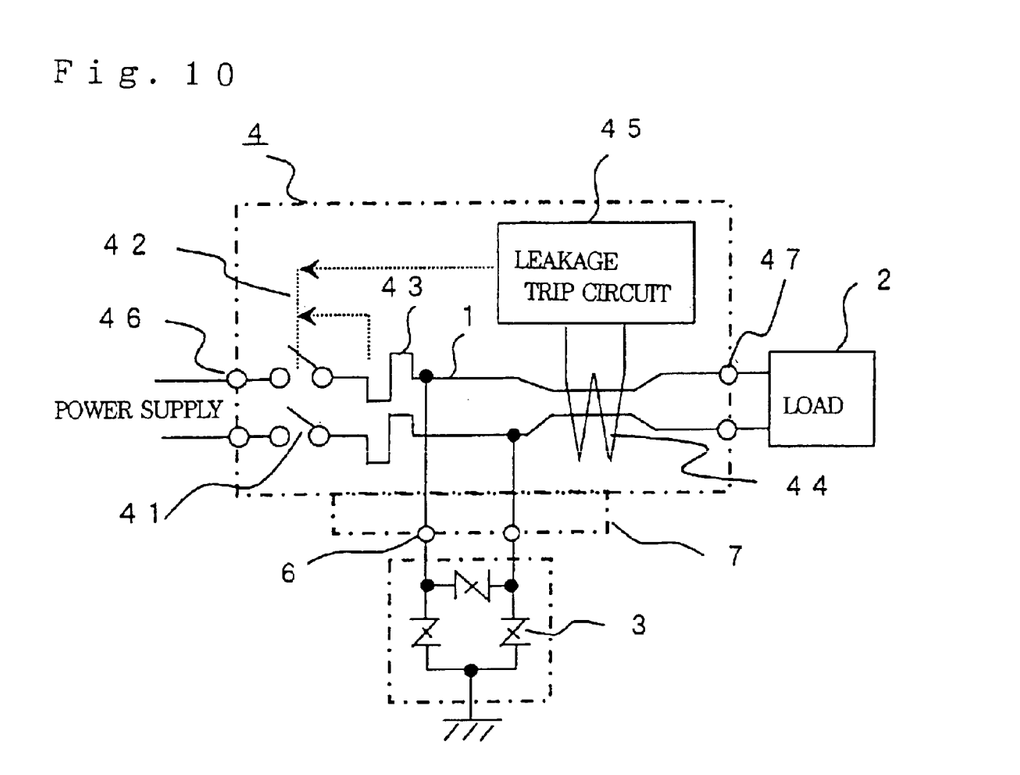
FIG. 10 is a diagram showing a connection arrangement between an earth leakage breaker and a lightning arrester according to Embodiment 5 of the invention.

FIG. 10 is a diagram showing a connection arrangement between an earth leakage breaker and a lightning arrester according to Embodiment 5 of the invention, and FIGS. 11(a) and (b) are exterior views each showing the earth leakage breaker of Example 1 according to Embodiment 5. FIGS. 12(a) and (b) are exterior views each showing the earth leakage breaker of Example 2 according to Embodiment 5, and FIGS. 13(a), (b) and (c) are exterior views each showing the earth leakage breaker of Example 3 according to Embodiment 5.

In the drawings, numerals 1 to 4 and 41 to 47 are the same as those described in the foregoing Embodiment 4. Numeral 7 is a terminal block provided with the connecting terminal 6 and mounted on the earth leakage breaker 4. The connection terminal 6 is electrically connected between the overcurrent detector section 43 and the zero phase current transformer 44 disposed in the earth leakage breaker 4. It is possible to connect the lightning arrester 3 of any performance to this connection terminal 6 from outside. The connecting terminal 6 serving as a charging section is insulated by an insulating cover or the like not shown in order to prevent the connecting terminal 6 from being exposed.

Figure 11:
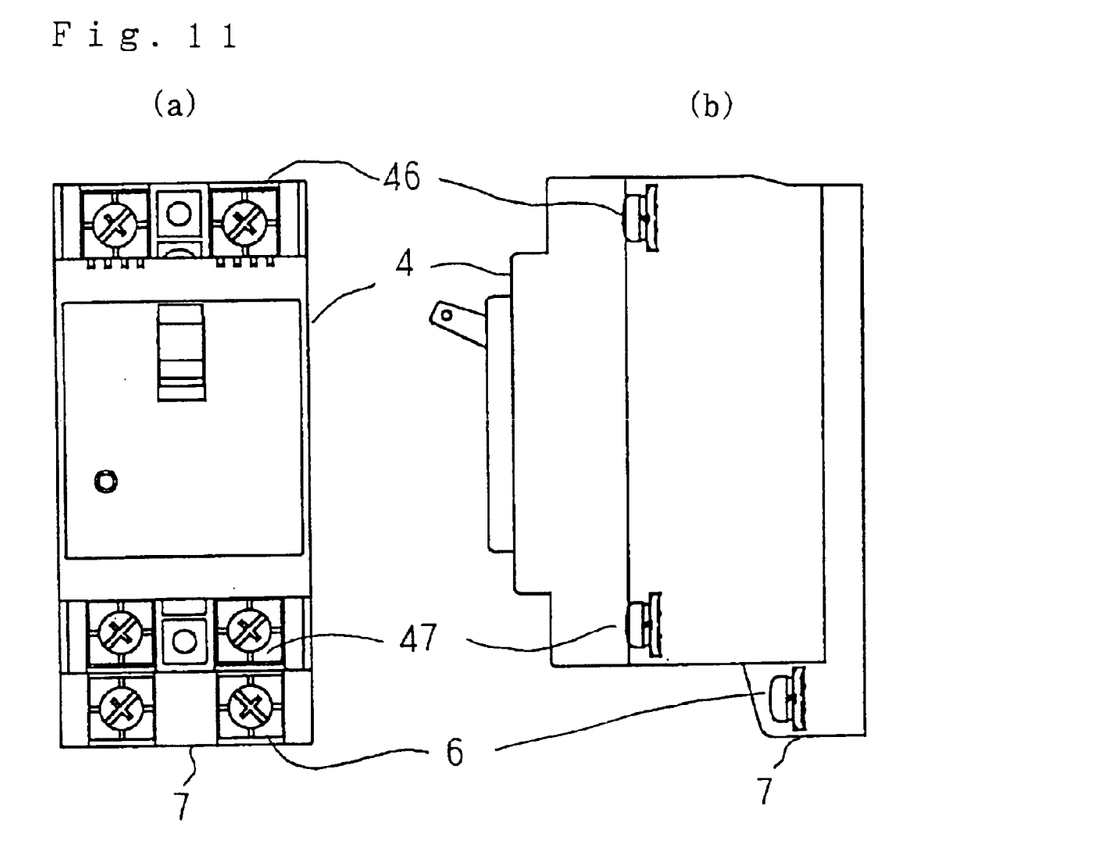
Figure 12:
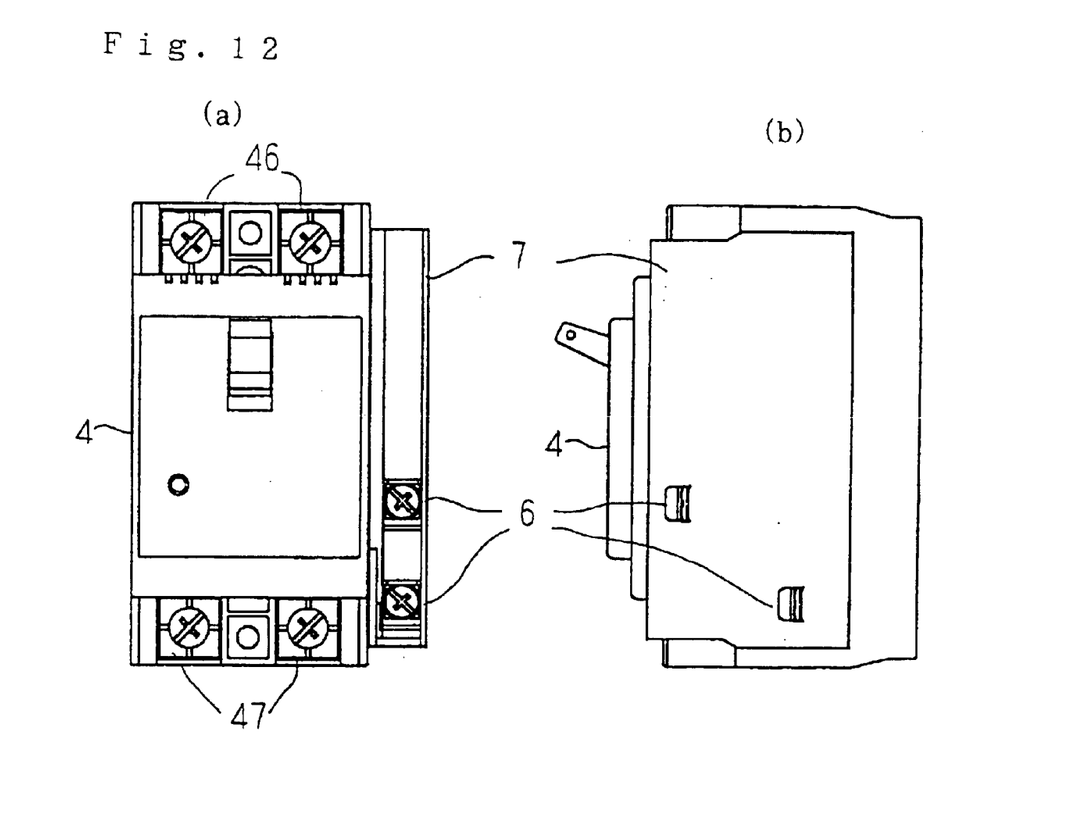
Figure 13:
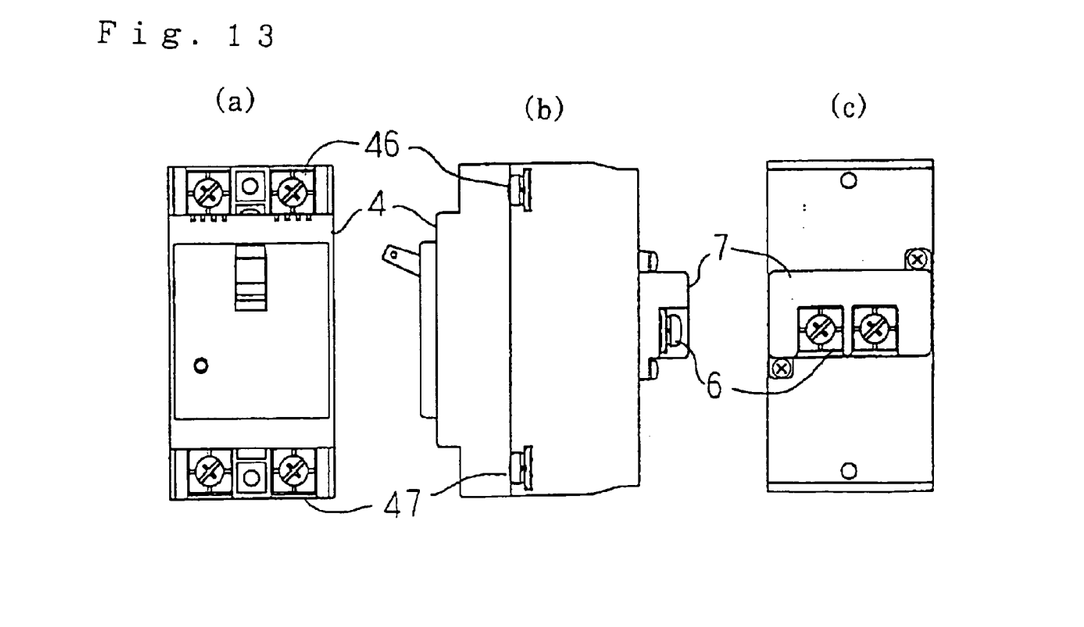

The earth leakage breaker of Example 1 of Embodiment 5 shown in FIG. 11 has the connecting terminal 6 at the front, and this facilitates wiring of the lightning arrester 3. In the earth leakage breaker of Example 2 shown in FIG. 12, the terminal block 7 is disposed on the side face of the earth leakage breaker 4, and the connecting terminal 6 is provided in the front direction, and this facilitates wiring of the lightning arrester 3 and makes it possible to keep a switchboard small because depth and height of the earth leakage breaker are not increased. In the earth leakage breaker of Example 3 shown in FIG. 13, the terminal block 7 is disposed on the rear side of the earth leakage breaker, and this makes it possible to install the earth leakage breaker without increasing the area occupied by the earth leakage breaker in the switchboard.

Embodiment 6.

Figure 14:
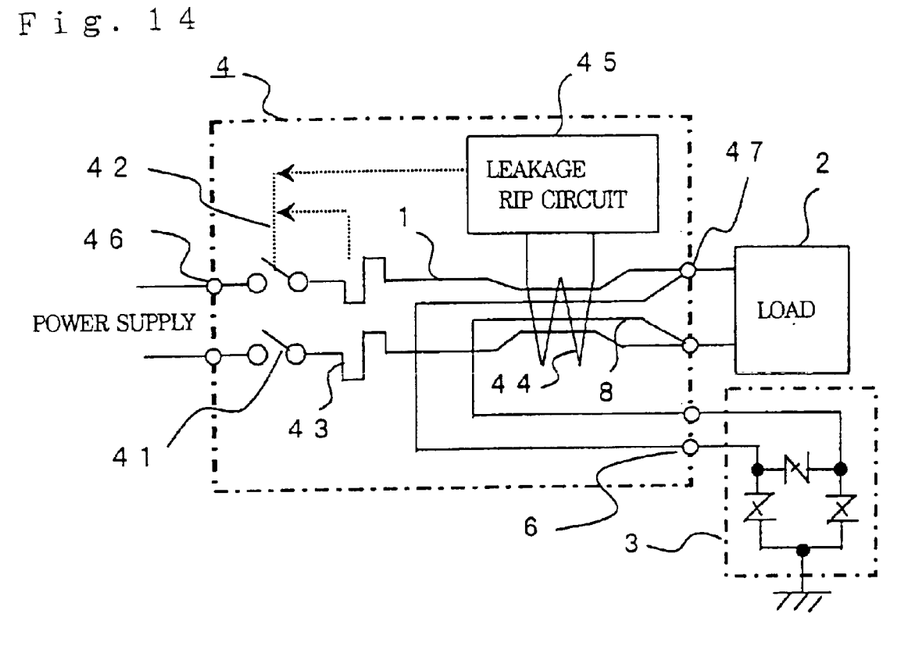
FIG. 14 is a diagram showing a connection arrangement between an earth leakage breaker and a lightning arrester according to Embodiment 6 of the invention.

An earth leakage breaker according to Embodiment 6 provides this invention in a case where it is impossible to connect the lightning arrester 3 between the overcurrent detector section 43 and the zero phase current transformer 44 due to the internal structure of the earth leakage breaker. FIG. 14 is a diagram showing a connection arrangement between an earth leakage breaker and a lightning arrester according to Embodiment 6 of the invention.

In the drawing, numerals 1 to 4 and 41 to 47 are the same as those described in the foregoing Embodiment 1. Numeral 8 is a lead wire leading to the lightning arrester 3 with one end connected to the load side terminal 47. The lightning arrester 3 is connected to the other end rewound along the through electric path 1 being the primary winding of the zero phase current transformer 44.

In the arrangement described above, if it is impossible to connect the lightning arrester 3 between the overcurrent detector section 43 and the zero phase current transformer 44 due to the internal structure of the earth leakage breaker, it is now possible to achieve substantially the same advantage as the arrangement in which the lightning arrester 3 is connected between the overcurrent detector section 43 and the zero phase current transformer 44.

Any lightning surge that has invaded passes through the zero phase current transformer 44, reaches the load side terminal 47, and is absorbed by the lightning arrester 3 via the lead wire 8. The lead wire 8 is rewound in the same winding number as the primary winding of the zero phase current transformer 44, and therefore any electromagnetic action of the lightning surge current absorbed by the lightning arrester 3 on the zero phase current transformer 44 is cancelled. When the power supply is short-circuited due to the short-circuit and breakdown of lightning arrester 3, the overcurrent detector section 43 detects the short circuit, and the contact 41 is opened for interruption. Consequently, any short circuit accident is prevented as well as in the foregoing description.

INDUSTRIAL APPLICABILITY

Referring to each of the drawings, an earth leakage breaker of which power supply wiring is arranged in a single-phase two-wire system has been described so far in order to simplify the explanation. It is a matter of course that the invention is applicable to an earth leakage breaker with its power supply wiring arranged in a single-phase three-wire system, a three-phase three-wire system, and the like. Moreover, it is a matter of course that a lightning arrester including any one of a zinc oxide varistor, a lightning rod, a resistance, a coil and a capacitor, or a combination thereof, is applicable to the invention.

In the invention, since the lightning arrester 3 is connected between the overcurrent detector section 43 and the zero phase current transformer 44, it is possible to prevent any leakage malfunction due to a lightning surge because the lightning surge does not pass through the zero phase current transformer 44. Furthermore, when the lightning arrester 3 is broken and short-circuited by a high-level lightning surge, the overcurrent detector section 43 detects the short circuit and opens the contact 41 in order to prevent a power supply short circuit accident.

What is claimed is:

1. An earth leakage breaker comprising:

a contact that turns on/off an electric path by opening and closing operation of a switch mechanism;

an overcurrent detector section that opens said contact by releasing said switch mechanism from a closed state upon detecting an overcurrent of said electric path;

a zero phase current transformer for detecting a leak of said electric path; and a leakage trip means that opens said contact by releasing said switch mechanism from the closed state when said zero phase current transformer detects a current leakage exceeding a predetermined level;

wherein said contact, the overcurrent detector section, and the zero phase current transformer are disposed in order from a power supply side to a load side of said electric path; and said earth leakage breaker further comprising connecting means for connection from a portion between said overcurrent detector section and said zero phase current transformer to a lightning arrestor, wherein the connecting means for connection to the lightning arrester is a lead wire led out from an opening provided on the housing of the earth leakage breaker.

2. An earth leakage breaker comprising:

a contact that turns on/off an electric path by opening and closing operation of a switch mechanism;

an overcurrent detector section that opens said contact by releasing said switch mechanism from a closed state upon detecting an overcurrent of said electric path;

a zero phase current transformer for detecting a leak of said electric path; and a leakage trip means that opens said contact by releasing said switch mechanism from the closed state when said zero phase current transformer detects a current leakage exceeding a predetermined level;

wherein said contact, the overcurrent detector section, and the zero phase current transformer are disposed in order from a power supply side to a load side of said electric path; and said earth leakage breaker further comprising connecting means for connection from a portion between said overcurrent detector section and said zero phase current transformer to a lightning arrestor, wherein the connecting means for connection to the lightning arrester is a terminal disposed on the housing of the earth leakage breaker.

3. An earth leakage breaker comprising:

a contact that turns on/off an electric path by opening and closing operation of a switch mechanism;

an overcurrent detector section that opens said contact by releasing said switch mechanism from a closed state upon detecting an overcurrent of said electric path;

a zero phase current transformer for detecting a leak of said electric path; and a leakage trip means that opens said contact by releasing said switch mechanism from the closed state when said zero phase current transformer detects a current leakage exceeding a predetermined level;

wherein said contact, the overcurrent detector section, and the zero phase current transformer are disposed in order from a power supply side to a load side of said electric path; and said earth leakage breaker further comprising connecting means for connection from a portion between said overcurrent detector section and said zero phase current transformer to a lightning arrestor, wherein the connecting means for connection to the lightning arrester is a terminal disposed on a terminal block of the earth leakage breaker.

4. An earth leakage breaker comprising:

a contact that turns on/off an electric path by opening and closing operation of a switch mechanism;

an overcurrent detector section that opens said contact by releasing said switch mechanism from a closed state upon detecting an overcurrent of said electric path;

a zero phase current transformer for detecting a leak of said electric path; and a leakage trip means that opens said contact by releasing said switch mechanism from the closed state when said zero phase current transformer detects a current leakage exceeding a predetermined level;

wherein said contact, the overcurrent detector section, and the zero phase current transformer are disposed in order from a power supply side toward a load side of said electric path; and a lead wire connected to a terminal on the load side at a first end, said lead wire being rewound in the same winding number as a primary winding of the zero phase current transformer, and connected to a lightning arrester at a second end.

* * * * *